United States Patent
Kato et al.

(10) Patent No.: US 11,130,495 B2
(45) Date of Patent: Sep. 28, 2021

(54) CONTROL APPARATUS FOR HYBRID VEHICLE

(71) Applicants: TOYOTA JIDOSHA KABUSHIKI KAISHA, Toyota (JP); AISIN AW CO., LTD., Anjo (JP)

(72) Inventors: Shunya Kato, Seto (JP); Yasutaka Tsuchida, Toyota (JP); Kenji Uchida, Nagoya (JP); Takuro Kumada, Anjo (JP)

(73) Assignees: TOYOTA JIDOSHA KABUSHIKI KAISHA, Toyota (JP); AISIN CORPORATION, Anjo (JP)

(*) Notice: Subject to any disclaimer, the term of this patent is extended or adjusted under 35 U.S.C. 154(b) by 0 days.

(21) Appl. No.: 16/110,200

(22) Filed: Aug. 23, 2018

(65) Prior Publication Data

US 2019/0100214 A1 Apr. 4, 2019

(30) Foreign Application Priority Data

Sep. 29, 2017 (JP) .............................. JP2017-190085

(51) Int. Cl.
*B60W 30/20* (2006.01)
*B60W 20/10* (2016.01)
(Continued)

(52) U.S. Cl.
CPC ............. *B60W 30/20* (2013.01); *B60K 6/365* (2013.01); *B60W 10/06* (2013.01); *B60W 10/08* (2013.01);
(Continued)

(58) Field of Classification Search
CPC ....... B60W 2510/06; B60W 2510/083; B60W 2540/10; B60W 2710/06;
(Continued)

(56) References Cited

U.S. PATENT DOCUMENTS 5,591,102 A * 1/1997 White ................... B60W 10/06
477/107
5,609,548 A * 3/1997 White ..................... F16H 61/16
477/124
(Continued)

FOREIGN PATENT DOCUMENTS

CN 104047745 A 9/2014
JP 2007-001451 A 1/2007
(Continued)

*Primary Examiner* — Redhwan K Mawari
(74) *Attorney, Agent, or Firm* — Oliff PLC (57) ABSTRACT

A power control ECU controls electric power and engine power of a hybrid vehicle. The power control ECU includes a request driving force calculating portion that calculates a request driving force calculated in accordance with an accelerator operation amount, a travel driving force calculating portion that calculates a travel driving force as a value that belatedly follows the request driving force, and a dashpot control processing portion. The dashpot control processing portion sets a value of the request driving force as a value of a final request driving force used to calculate request engine power when a difference of the request driving force with respect to the travel driving force is less than a predetermined positive value, and sets a value that belatedly follows the request driving force when the difference is greater than or equal to the predetermined positive value.

8 Claims, 8 Drawing Sheets

(51) Int. Cl.
*B60W 10/06* (2006.01)
*B60W 10/08* (2006.01)
*B60W 10/30* (2006.01)
*B60K 6/365* (2007.10)

(52) U.S. Cl.
CPC ............ *B60W 10/30* (2013.01); *B60W 20/10* (2013.01); *B60W 2510/06* (2013.01); *B60W 2510/083* (2013.01); *B60W 2540/10* (2013.01); *B60W 2710/06* (2013.01); *B60W 2710/0644* (2013.01); *B60W 2710/083* (2013.01); *B60W 2710/30* (2013.01); *B60Y 2200/92* (2013.01)

(58) Field of Classification Search
CPC ... B60W 2710/0644; B60W 2710/083; B60W 2710/30; B60W 30/20; B60W 10/06; B60W 10/08; B60W 10/30; B60W 20/10; B60Y 2200/92; B60K 6/365
See application file for complete search history.

(56) References Cited

U.S. PATENT DOCUMENTS

| | | | | |
|---|---|---|---|---|
| 6,066,070 | A * | 5/2000 | Ito | B60W 30/1819 477/43 |
| 6,454,676 | B1 * | 9/2002 | Date | B60W 10/06 477/120 |
| 10,119,485 | B2 * | 11/2018 | Kono | F02D 11/106 |
| 10,260,433 | B2 * | 4/2019 | Okubo | B60K 6/365 |
| 2002/0049525 | A1 * | 4/2002 | Speicher | F16H 59/18 701/51 |
| 2003/0040402 | A1 * | 2/2003 | Loeffler | B60W 10/11 477/70 |
| 2006/0287794 | A1 * | 12/2006 | Gianoglio | B60W 30/18 701/53 |
| 2007/0023210 | A1 * | 2/2007 | Bernardi | B60W 10/08 307/10.1 |
| 2007/0111848 | A1 | 5/2007 | Tabata et al. | |
| 2007/0140503 | A1 * | 6/2007 | Sakamoto | G10K 11/17823 381/71.4 |
| 2012/0270697 | A1 * | 10/2012 | Takami | B60K 6/387 477/5 |
| 2014/0278002 | A1 | 9/2014 | Okubo | |
| 2014/0372012 | A1 * | 12/2014 | Darnell | F02D 41/021 701/110 |
| 2016/0221468 | A1 * | 8/2016 | Suzuki | B60L 3/106 |
| 2017/0066430 | A1 * | 3/2017 | Kim | B60W 10/06 |
| 2017/0137018 | A1 * | 5/2017 | Kim | B60W 10/08 |
| 2017/0361828 | A1 * | 12/2017 | Diaz | B60K 6/48 |
| 2018/0057007 | A1 * | 3/2018 | Kromrey | B60W 30/1882 |
| 2018/0147952 | A1 * | 5/2018 | Kwon | B60W 10/26 |
| 2018/0334160 | A1 * | 11/2018 | Kava | B60W 20/19 |
| 2019/0031178 | A1 * | 1/2019 | Liu | F02N 11/0814 |
| 2019/0100214 | A1 * | 4/2019 | Kato | B60K 6/365 |
| 2019/0248247 | A1 * | 8/2019 | Yamaguchi | B60K 6/52 |

FOREIGN PATENT DOCUMENTS

| | | |
|---|---|---|
| JP | 2009-227025 A | 10/2009 |
| JP | 2010-155532 A | 7/2010 |

\* cited by examiner

CONTROL APPARATUS FOR HYBRID VEHICLE

BACKGROUND ART

The present invention relates to a control apparatus for a hybrid vehicle that travels by a driving force generated by a power unit having two types of driving sources, i.e., having an engine and a motor generator.

Japanese Laid-Open Patent Publication No. 2010-155532 discloses a known control apparatus for a hybrid vehicle. This control apparatus calculates a request driving force in accordance with an accelerator operation amount and controls output of an engine and torque of a motor generator so that a power unit generates the driving force based on the request driving force. The control apparatus increases or decreases the driving force generated by the power unit in conjunction with an increase or a decrease in the accelerator operation amount.

The above hybrid vehicle needs to damp vibration of a vehicle body caused by a quick decrease in the driving force when the accelerator is deactivated. Thus, torque control is performed on the motor generator to gradually decrease the driving force generated by the power unit. The amount of electric power supplied to the motor generator is limited by, for example, a battery charging condition. Thus, there may be a case in which the motor generator cannot be supplied with electric power that is sufficient for torque control performed when the accelerator is released. In this case, vehicle body vibration is liable to occur.

SUMMARY OF THE INVENTION

An object of the present invention is to provide a control apparatus for a hybrid vehicle that is capable of appropriately damping vehicle body vibration.

To achieve the above object, a first aspect of the present invention provides a control apparatus for a hybrid vehicle that travels by a driving force generated by a power unit having an engine and a motor generator as two types of driving sources. The control apparatus includes a request driving force calculating portion configured to calculate a request driving force in accordance with an accelerator operation amount; a travel driving force calculating portion configured to calculate a travel driving force as a value that belatedly follows the request driving force; a request engine output calculating portion configured to calculate a request engine output, which is a request value of engine output, in accordance with the request driving force; an engine output controller configured to control output of the engine in accordance with the request engine output; a command torque calculating portion configured to calculate torque of the motor generator that is needed so that the power unit generates a driving force according to the travel driving force as a command torque in a state in which the engine generates output according to the request engine output; a motor torque controller configured to control torque of the motor generator in accordance with the command torque; and a dashpot control processing portion configured to calculate a dashpot control request driving force as a value that belatedly follows the request driving force when a difference obtained by subtracting the request driving force from the travel driving force is greater than or equal to a predetermined positive value. The request engine output calculating portion is configured to calculate the request engine output in accordance with the dashpot control request driving force in a period during which the difference obtained by subtracting the request driving force from the travel driving force is greater than or equal to the predetermined positive value.

To achieve the above object, a second aspect of the present invention provides a control apparatus for a hybrid vehicle that travels by a driving force generated by a power unit having an engine and a motor generator as two types of driving sources. The control apparatus includes a circuit including a request driving force calculating portion configured to calculate a request driving force in accordance with an accelerator operation amount; a travel driving force calculating portion configured to calculate a travel driving force as a value that belatedly follows the request driving force; a request engine output calculating portion configured to calculate a request engine output, which is a request value of engine output, in accordance with the request driving force; an engine output controller configured to control output of the engine in accordance with the request engine output; a command torque calculating portion configured to calculate torque of the motor generator that is needed so that the power unit generates a driving force according to the travel driving force as a command torque in a state in which the engine generates output according to the request engine output; a motor torque controller configured to control torque of the motor generator in accordance with the command torque; and a dashpot control processing portion configured to calculate a dashpot control request driving force as a value that belatedly follows the request driving force when a difference obtained by subtracting the request driving force from the travel driving force is greater than or equal to a predetermined positive value. The request engine output calculating portion is configured to calculate the request engine output in accordance with the dashpot control request driving force in a period during which the difference obtained by subtracting the request driving force from the travel driving force is greater than or equal to the predetermined positive value.

To achieve the above object, a third aspect of the present invention provides a method for controlling a hybrid vehicle that travels by a driving force generated by a power unit having an engine and a motor generator as two types of driving sources. The method includes calculating a request driving force in accordance with an accelerator operation amount; calculating a travel driving force as a value that belatedly follows the request driving force; calculating a request engine output, which is a request value of engine output, in accordance with the request driving force; controlling output of the engine in accordance with the request engine output; calculating torque of the motor generator that is needed so that the power unit generates a driving force according to the travel driving force as a command torque in a state in which the engine generates output according to the request engine output; controlling torque of the motor generator in accordance with the command torque; calculating a dashpot control request driving force as a value that belatedly follows the request driving force when a difference obtained by subtracting the request driving force from the travel driving force is greater than or equal to a predetermined positive value; and calculating the request engine output in accordance with the dashpot control request driving force in a period during which the difference obtained by subtracting the request driving force from the travel driving force is greater than or equal to the predetermined positive value.

Other aspects and advantages of the embodiments will become apparent from the following description, taken in conjunction with the accompanying drawings, illustrating by way of example the principles of the invention.

DESCRIPTION OF THE EMBODIMENTS

One embodiment of a control apparatus for a hybrid vehicle will be hereinafter described in detail with reference to FIGS. 1 to 12.

Figure 1:
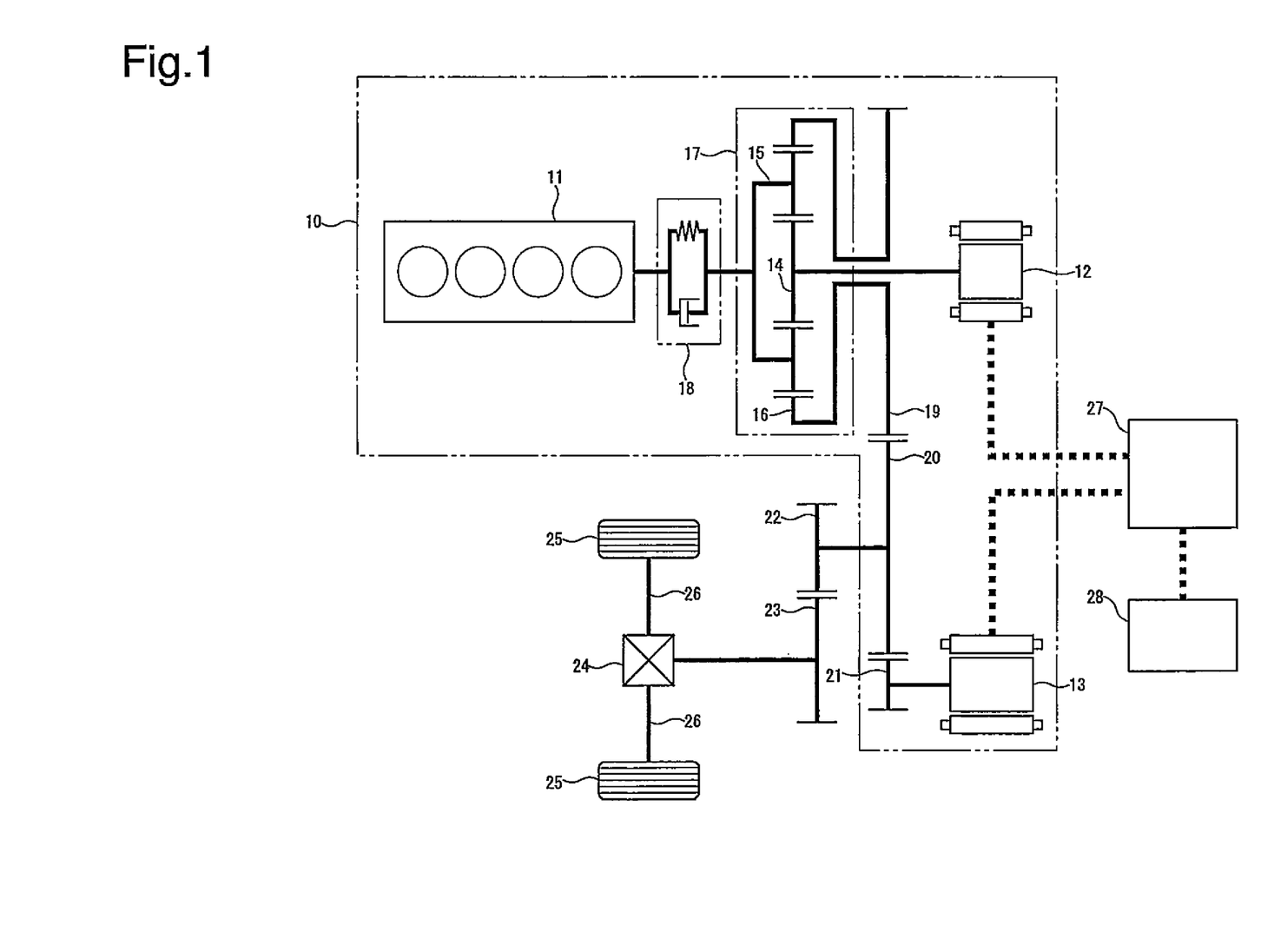
FIG. 1 is a schematic view showing a drive system configuration of a hybrid vehicle.

As shown in FIG. 1, the hybrid vehicle includes a power unit 10 that generates a driving force that is transmitted to wheels 25. The power unit 10 has two types of power sources, i.e., has an engine 11 and two motor generators, namely, a first motor generator (hereinafter referred to as the first M/G 12) and a second motor generator (hereinafter referred to as the second M/G 13).

The power unit 10 is provided with a planetary gear mechanism 17 that has three rotary elements, namely, a sun gear 14, a planetary carrier 15, and a ring gear 16. The planetary carrier 15 is connected to the engine 11 through a transaxle damper 18. The sun gear 14 is connected to the first M/G 12. The ring gear 16 is integrated with a counter drive gear 19. The counter drive gear 19 is engaged with a counter driven gear 20. The second M/G 13 is connected to a reduction gear 21 engaged with the counter driven gear 20.

The counter driven gear 20 is connected to a final drive gear 22 so as to be rotatable integrally with the final drive gear 22. The final drive gear 22 is engaged with a final driven gear 23. The final driven gear 23 is connected to a driving shaft 26 of the two wheels 25 through a differential mechanism 24.

The first M/G 12 and the second M/G 13 are electrically connected to a battery 28 through an inverter 27. The inverter 27 regulates the amount of electric power transferred between the first M/G 12 and the battery 28 and the amount of electric power transferred between the second M/G 13 and the battery 28.

Figure 2:
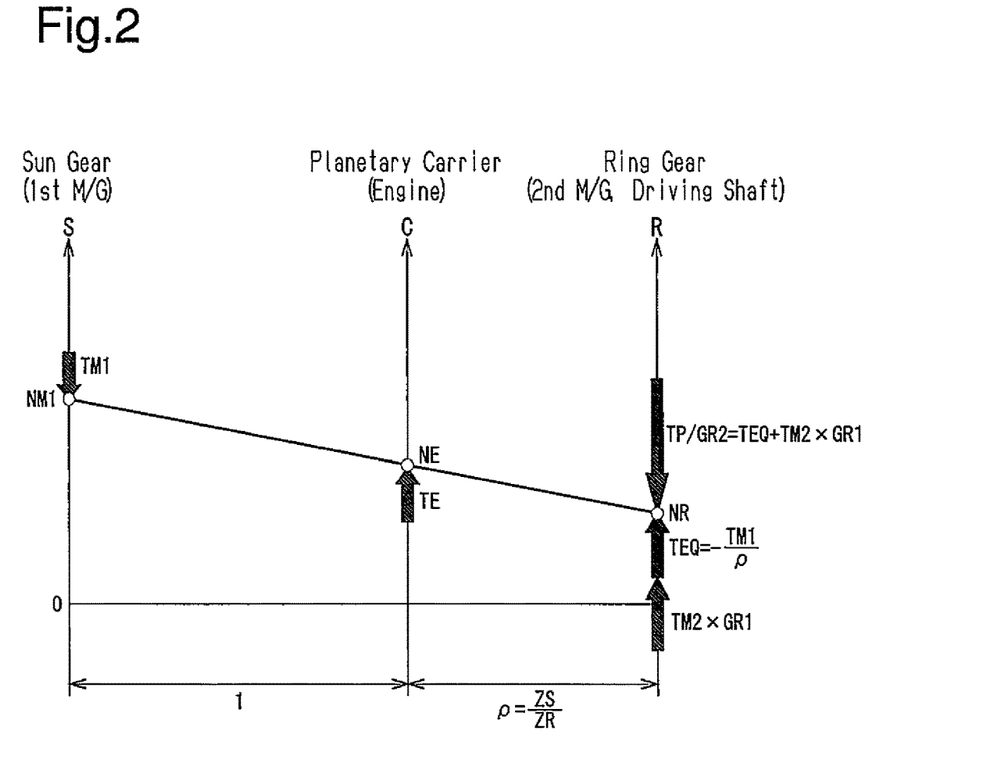
FIG. 2 is a view showing a relationship between a torque and the rotational speed among rotary elements of a planetary gear mechanism disposed at a power unit of the hybrid vehicle.

FIG. 2 shows a collinear diagram of three rotary elements, which are the sun gear 14, the planetary carrier 15, and the ring gear 16 forming the planetary gear mechanism 17. In the collinear diagram, an axis S represents the number of rotations of the sun gear 14 (=first MG rotational speed NM1), an axis C represents the number of rotations of the planetary carrier 15 (=engine rotational speed NE), and an axis R represents the number of rotations of the ring gear 16 (=ring gear rotational speed NR). The axes S, C, and R are shown so that the ratio of the interval between the axis S and the axis C to the interval between the axis C and the axis R is "1: $\rho$" where "$\rho$" is the ratio of the number of gear teeth ZS in the sun gear 14 to the number of gear teeth ZR in the ring gear 16. In the collinear diagram, the number of rotations of the sun gear 14, the number of rotations of the planetary carrier 15, and the number of rotations of the ring gear 16 are always aligned with each other. The number of rotations of each rotary element is determined when torques acting on the rotary elements are balanced.

Additionally, FIG. 2 shows a relationship among torques acting on the rotary elements of the planetary gear mechanism 17. The torque of the first M/G 12 (first motor torque TM1) is directly transmitted to the sun gear 14, which is directly connected to the first M/G 12. The torque of the engine 11 (engine torque TE) is directly transmitted to the planetary carrier 15, which is directly connected to the engine 11.

The ring gear 16 is connected to the second M/G 13 through the counter drive gear 19, the counter driven gear 20, and the reduction gear 21. Torque transmitted from the second M/G 13 to the ring gear 16 corresponds to the product (=TM2×GR1) of the torque (second motor torque TM2) of the second M/G 13 and the ratio GR1 (=Z2/Z1) of the number Z2 of gear teeth in the counter drive gear 19 to the number Z1 of gear teeth in the reduction gear 21. FIG. 2 shows a state in which the first M/G 12 is generating electricity by means of output transmitted from the engine 11. In this state, the first motor torque TM1 has a negative value.

The output of the engine 11 is distributed to the sun gear 14 and the ring gear 16. At this time, the torque (direct torque TEQ) transmitted from the engine 11 to the ring gear 16 corresponds to a value (−TM1/$\rho$) obtained by dividing the first motor torque TM1 by the ratio $\rho$ and performing a positive/negative inversion on the quotient based on the balanced torques of the rotary elements. The torque output from the ring gear 16 to the driving shaft 26 corresponds to a value proportional to the sum (=TEQ+TM2×GR1) of the direct torque TEQ and the product of the second motor torque TM2 and the ratio GR1.

The torque transmitted from the counter driven gear 20 to the final drive gear 22 is defined as a driving force TP that is generated by the power unit 10. Therefore, the driving force TP is the product of the sum (=TEQ+TM2×GR1) and the ratio GR2 (=Z3/Z2) of the number Z3 of gear teeth in the counter driven gear 20 to the number Z2 of gear teeth in the counter drive gear 19.

Figure 3:
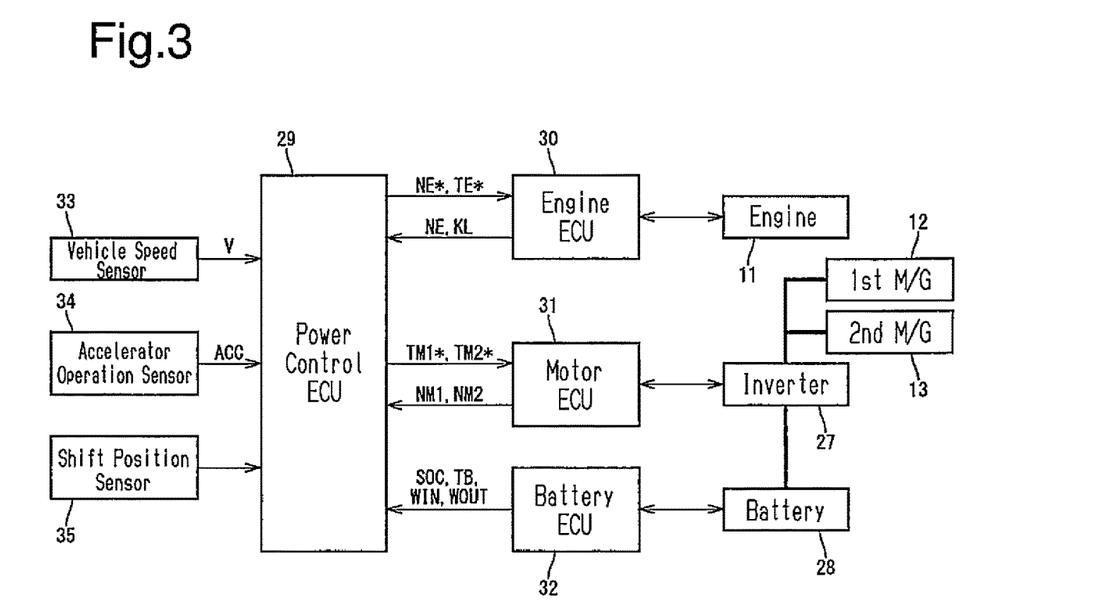
FIG. 3 is a schematic view showing a configuration of a control apparatus for the hybrid vehicle.

FIG. 3 shows a configuration of the control apparatus for the hybrid vehicle. The control apparatus includes four electronic control units (ECUs), namely, a power control ECU 29 that controls the entire electric power and engine power of the hybrid vehicle, an engine ECU 30 that controls the engine 11, a motor ECU 31 that controls torque of the first M/G 12 and torque of the second M/G 13, and a battery ECU 32 that controls the battery 28. The engine ECU 30 corresponds to an engine output controller that controls the output of the engine 11. The motor ECU 31 corresponds to a motor torque controller that controls the torque of the motor generators (the first M/G 12 and the second M/G 13).

The control apparatus is not limited to an apparatus that executes all of its processes through software processing. For example, the control apparatus may include a dedicated hardware circuit (e.g., application specific integrated circuit: ASIC) that executes at least part of its processes through hardware processing. In other words, the control apparatus can be configured as 1) one or more processors that operate in accordance with computer programs (software), 2) one or more dedicated hardware circuits that execute at least part of various processes, or 3) circuitry that includes a combination of these. The processor includes a CPU and memories, such as a RAM and a ROM. The memories store program codes or commands configured to allow the CPU to execute a process. The memories, or computer readable media, include all available media that can be accessed by a general purpose computer or by a dedicated computer.

The power control ECU 29 is connected to a vehicle speed sensor 33 that detects the travel speed (vehicle speed V) of the hybrid vehicle, an accelerator operation sensor 34 that detects the amount of the accelerator pedal operated by the driver (accelerator operation amount ACC), and a shift position sensor 35 that detects the position of the shifter operated by the driver. The power control ECU 29 receives the detection results from each of the sensors described above. The power control ECU 29 also receives information showing the operational state of the engine 11, such as the engine rotational speed NE and an engine load KL, from the engine ECU 30. The power control ECU 29 also receives a first motor rotational speed NM1, which is the rotational speed of the first M/G 12, and a second motor rotational speed NM2, which is the rotational speed of the second M/G 13, from the motor ECU 31. Additionally, the power control ECU 29 receives the state of charge SOC of the battery 28 from the motor ECU 31 and the temperature (battery temperature TB) of the battery 28 from the battery ECU 32. The battery ECU 32 calculates a charge limit value WIN and a discharge limit value WOUT, which are an upper limit of the charge amount per unit time and an upper limit of the discharge amount per unit time of the battery 28, respectively, from the state of charge SOC and the battery temperature TB. The battery ECU 32 sends the values to the power control ECU 29.

Based on the received information, the power control ECU 29 calculates a target engine rotational speed NE*, which is a target value of the engine rotational speed NE, and a target engine torque TE*, which is a target value of the engine torque TE, and sends the values to the engine ECU 30. Additionally, the power control ECU 29 calculates a first motor command torque TM1*, which corresponds to a command value of a torque generated by the first M/G 12, and a second motor command torque TM2*, which corresponds to a command value of a torque generated by the second M/G 13, and sends the values to the motor ECU 31. The engine ECU 30 controls the engine 11 in order to realize the target engine rotational speed NE* and the target engine torque TE*. The motor ECU 31 controls the inverter 27 so that the first M/G 12 generates the first motor command torque TM1* and the second M/G 13 generates the second motor command torque TM2*. Thus, the travel of the hybrid vehicle is controlled. The power control ECU 29 repeatedly calculates the target engine rotational speed NE*, the target engine torque TE*, the first motor command torque TM1*, and the second motor command torque TM2* in predetermined cycles.

Figure 4:
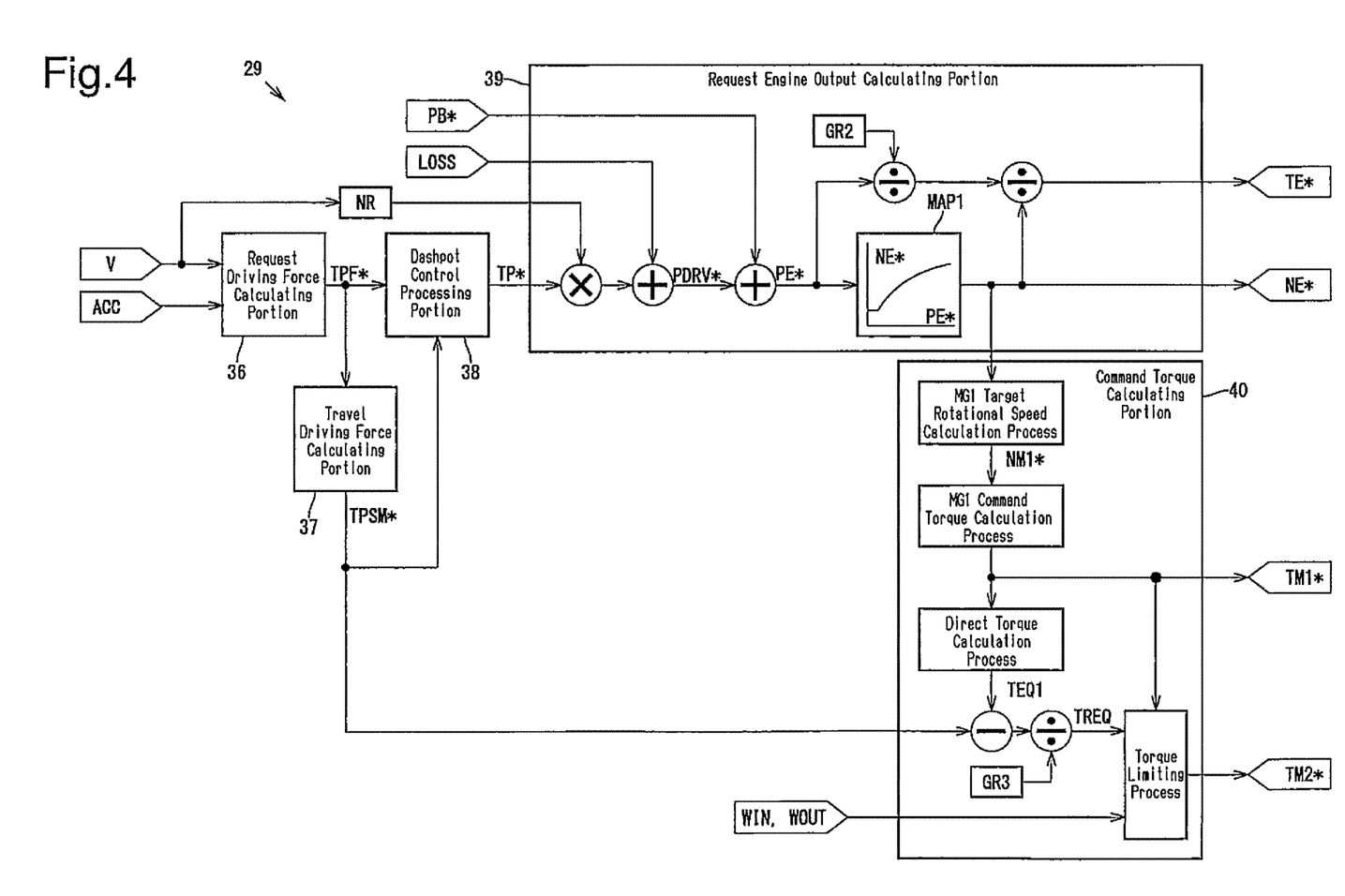
FIG. 4 is a block diagram of an electronic control unit for a hybrid.

FIG. 4 shows a control block diagram of the calculation process of the target engine rotational speed NE*, the target engine torque TE*, the first motor command torque TM1*, and the second motor command torque TM2*. The power control ECU 29 includes a request driving force calculating portion 36, a travel driving force calculating portion 37, a dashpot control processing portion 38, a request engine output calculating portion 39, and a command torque calculating portion 40.

Figure 5:
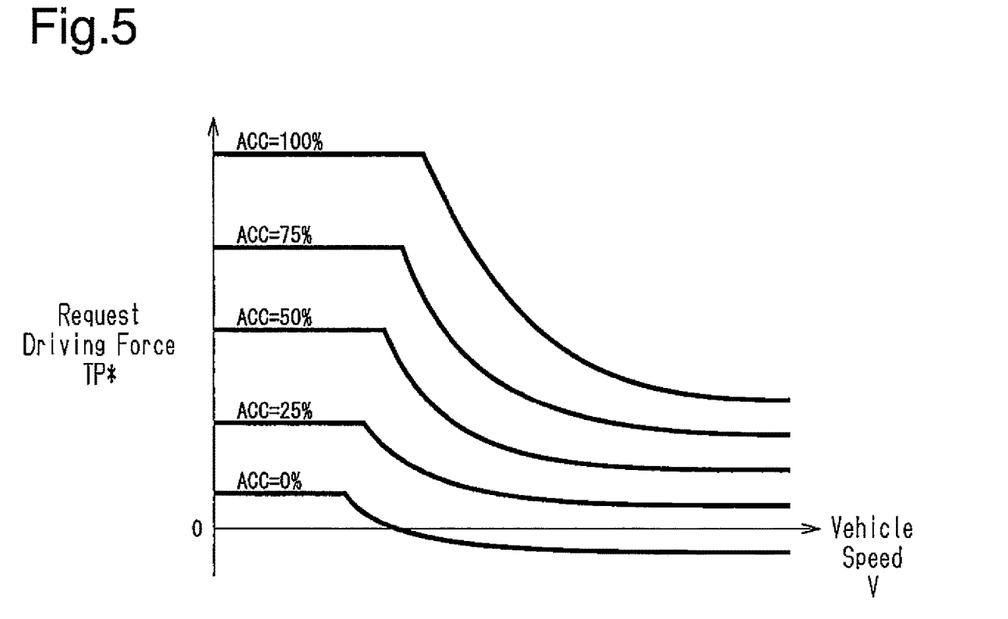
FIG. 5 is a graph showing a relationship between a vehicle speed, an accelerator operation amount, and a request driving force.

The request driving force calculating portion 36 calculates a request driving force TPF* based on the vehicle speed V and the accelerator operation amount ACC. FIG. 5 shows a relationship between the vehicle speed V and the request driving force TPF* when the accelerator operation amount ACC is 0%, 25%, 50%, 75%, and 100%. The value of the request driving force TPF* is calculated so as to be increased as the accelerator operation amount ACC is increased or as the vehicle speed V is reduced.

The dashpot control processing portion 38 calculates a final request driving force TP* by performing a dashpot control process, which will be described later, on the request driving force TPF*. Thereafter, the request engine output calculating portion 39 calculates request engine power PE*, which corresponds to the request value of engine output, from the final request driving force TP*. Additionally, the request engine output calculating portion 39 calculates the target engine rotational speed NE*, which is a target value of the engine rotational speed NE, and the target engine torque TE*, which is a target value of the engine torque TE, so that engine output is produced in accordance with the request engine power PE*.

The value of the request engine power PE* represents power transmitted from the engine 11 to the counter driven gear 20 when the transmissibility of power from the planetary carrier 15 to the ring gear 16 is 100%. In other words, the value of the request engine power PE* is the product of the request value of engine output (request engine output) and the ratio GR2. Herein, the request engine power PE* is calculated as a value of the request engine output.

The request engine output calculating portion 39 calculates the sum (=TP*×NR+LOSS) of the product of the final request driving force TP* and the ring gear rotational speed NR and a loss term LOSS as a value of the driver request power PDRV*. The ring gear rotational speed NR is calculated from the vehicle speed V. The loss term LOSS represents a torque loss caused by, for example, friction inside the engine 11. The loss term LOSS is calculated, for example, from the engine rotational speed NE. The driver request power PDRV* corresponds to engine output that is needed so that the engine 11 generates the final request driving force TP* in the power unit 10.

Figure 6:
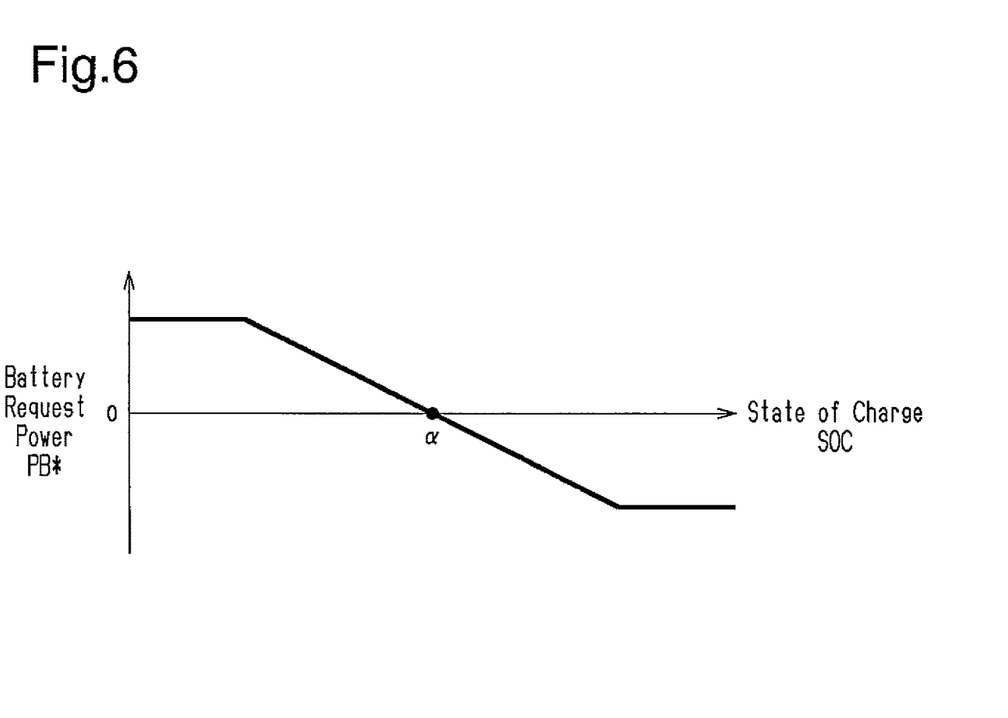
FIG. 6 is a graph showing a relationship between a state of charge and battery request power.

Thereafter, the request engine output calculating portion 39 calculates the sum (PDRV*+PB*) of the driver request power PDRV* and charge-discharge request power PB* as a value of the request engine power PE*. As shown in FIG. 6, the charge-discharge request power PB* has a negative value when the state of charge SOC is greater than a control target value a, and has a positive value when the state of charge SOC is less than the control target value a. The charge-discharge request power PB* corresponds to engine output that is needed so that the engine 11 generates a driving force supplied to the second M/G 13 in accordance with a charge/discharge request of the battery 28.

The request engine output calculating portion 39 calculates an engine rotational speed and an engine torque that allow efficient generation of engine output necessary for generating request engine power PE* as the target engine rotational speed NE* and the target engine torque TE*, respectively.

Figure 7:
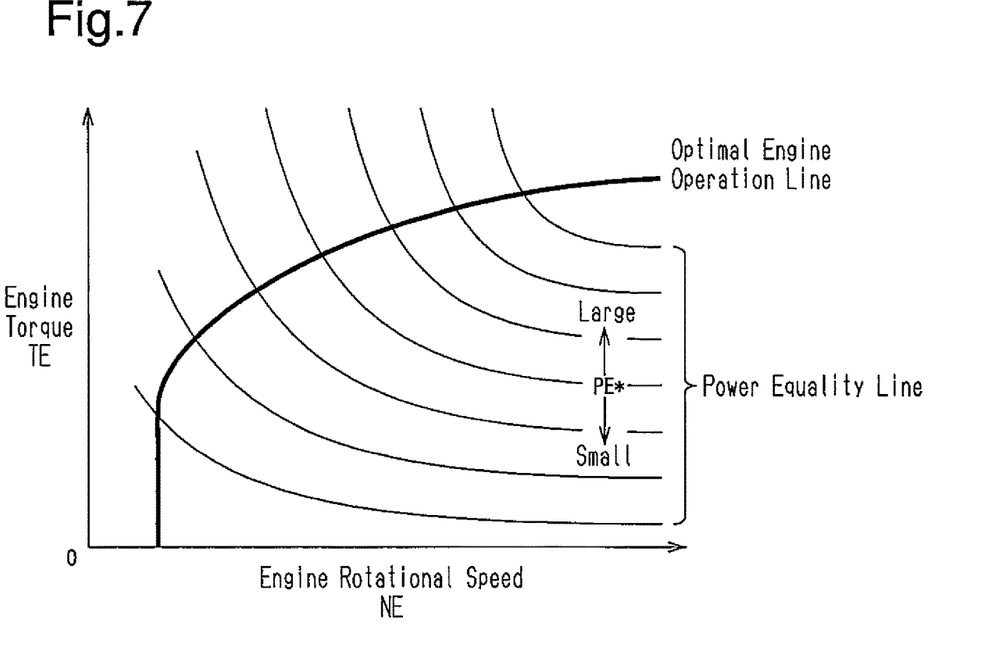
FIG. 7 is a graph showing a setting mode relative to a target engine rotational speed and a target engine torque.

The setting mode of the target engine rotational speed NE* and the setting mode of the target engine torque TE* will be described with reference to FIG. 7. The power equality lines shown in FIG. 7 are each a single curve line joining together engine operation points at which engine output is constant. The optimal engine operation line shown in FIG. 7 is a single curve line joining together engine operation points at which fuel efficiency and exhaust performance are optimal. Herein, the operation point of the engine 11 is defined by use of the engine rotational speed and engine torque. The request engine output calculating portion 39 calculates the engine rotational speed and engine torque that are indicated by an intersection of an optimal engine operation line and a power equality line corresponding to engine output equivalent to the request engine power PE* as a target engine rotational speed NE* and a target engine torque TE*, respectively. In practice, the request engine output calculating portion 39 calculates the target engine rotational speed NE* from the request engine power PE* by use of a calculation map MAP1 that stores a relationship between the request engine power PE* and the engine rotational speed indicated by the intersections. Then, the request engine output calculating portion 39 calculates a quotient (=PE*/(GR2×NE*)) obtained by dividing the request engine power PE* by the product of the ratio GR2 and the target engine rotational speed NE* as a value of the target engine torque TE*.

The travel driving force calculating portion 37 calculates a travel driving force TPSM* as a value that belatedly follows the request driving force TPF*. The travel driving force TPSM* is calculated as a value used to gradually change a driving force TP so that vehicle body vibration will not occur when the accelerator operation amount ACC is quickly changed.

The output that can be generated by the engine 11 has a lower limit. Thus, if the request engine power PE* is below the lower limit of the engine output, the request engine output calculating portion 39 sets the target engine torque TE* to zero. In this state, the engine ECU 30 controls the engine 11 so that fuel cutoff is performed. Additionally, the request engine output calculating portion 39 sets a target engine rotational speed for fuel cutoff as the target engine rotational speed NE*. In cases (a) to (e) described below, the fuel cutoff target engine rotational speed is set to be higher than in other cases.

(a) In a manual mode in which a driver performs a switching operation of virtual gear positions, the target engine rotational speed NE* is uniquely determined based on the virtual gear position selected by the driver and the vehicle speed V. In the manual mode, to ensure accelerating performance of re-acceleration after the accelerator is deactivated, an engine rotational speed that is higher than usual is set as the fuel cutoff target engine rotational speed.

(b) In a sequential mode in which the driver performs a switching operation of a virtual lower-limit gear position, the lower limit of the target engine rotational speed NE* is set based on the virtual lower-limit gear position selected by the driver and the vehicle speed V. In the sequential mode, to ensure accelerating performance of re-acceleration after the accelerator is deactivated, an engine rotational speed that is higher than usual is set as the fuel cutoff target engine rotational speed.

(c) In uphill control that is performed to improve traveling performance when the vehicle is traveling uphill, when the gradient of the road that is estimated from detection results of, for example, an acceleration sensor is greater than or equal to a predetermined positive value, a lower limit of the target engine rotational speed NE* is set based on the vehicle speed V. In the uphill control, to ensure accelerating performance of re-acceleration after the accelerator is deactivated, an engine rotational speed that is higher than usual is set as the fuel cutoff target engine rotational speed.

(d) In downhill control that is performed to improve engine brake performance when the vehicle is traveling downhill, when the gradient of the road that is estimated from detection results of, for example, an acceleration sensor is less than or equal to a predetermined negative value, a lower limit of the target engine rotational speed NE* is set based on the vehicle speed V. In the downhill control, to ensure engine braking force when the accelerator is deactivated, an engine rotational speed that is higher than usual is set as the fuel cutoff target engine rotational speed.

(e) In quick accelerator deactivation control that is performed to ensure accelerating performance of re-acceleration after the accelerator is deactivated, when the accelerator operation amount ACC quickly becomes zero from a state in which the accelerator operation amount ACC is greater than or equal to a predetermined value, an engine rotational speed that is higher than usual is set as the fuel cutoff target engine rotational speed.

Figure 8:
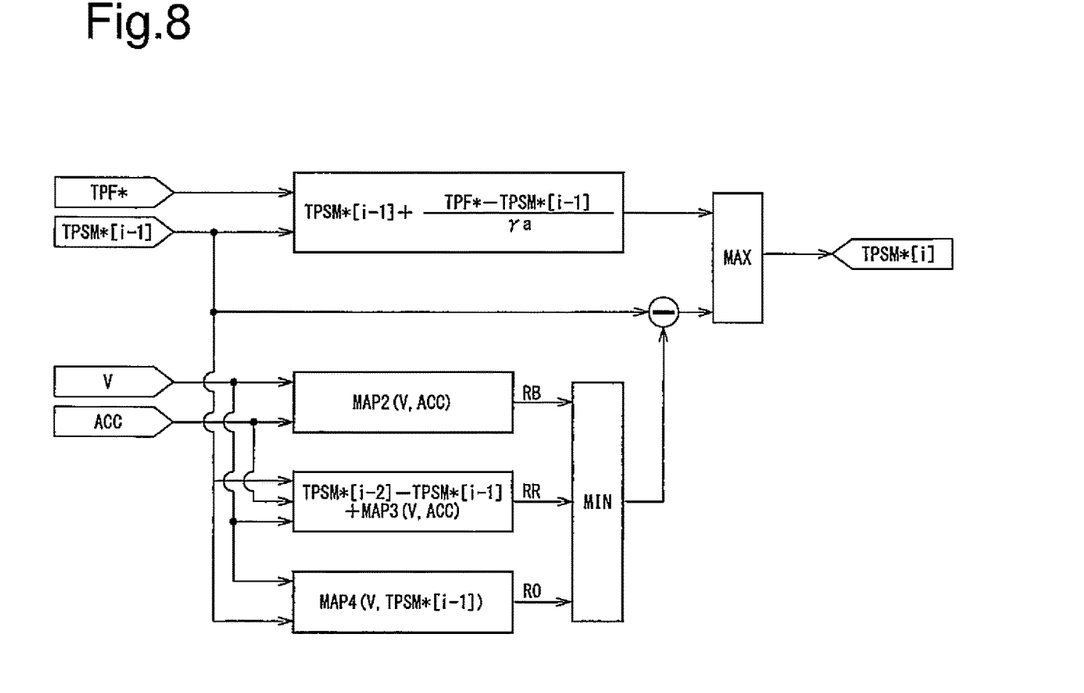
FIG. 8 is a block diagram of a calculation process of a travel driving force.

Next, a description will be given of a calculation process of the travel driving force TPSM* performed by the travel driving force calculating portion 37 with reference to FIG. 8. The travel driving force calculating portion 37 calculates a travel driving force TPSM* to gradually change a driving force generated by the power unit 10 so that vehicle body vibration will not occur when the accelerator operation amount ACC quickly changes. Hereinafter, the travel driving force TPSM* that is calculated in the present calculation cycle is referred to as the present value TPSM*[i]. The travel driving force TPSM* that is calculated in the last calculation cycle is referred to as the last value TPSM*[i−1]. The travel driving force TPSM* that is calculated in the calculation cycle before last is referred to as the before-last value TPSM*[i−2].

When the travel driving force TPSM* is calculated, the travel driving force calculating portion 37 calculates a base reduction rate RB based on the vehicle speed V and the accelerator operation amount ACC. The base reduction rate RB represents an upper limit of the reduction rate (amount of reduction per unit time) of a driving force TP that will not cause tardiness in acceleration of the hybrid vehicle and vehicle body vibration. The base reduction rate RB is calculated based on a calculation map MAP2 that stores a relationship among a vehicle speed V, an accelerator operation amount ACC, and an upper limit of the reduction rate beforehand calculated by, for example, experiments.

Additionally, the travel driving force calculating portion 37 calculates a rate-by-rate reduction rate RR based on the before-last value TPSM*[i−2], the last value TPSM*[i−1], the vehicle speed V, and the accelerator operation amount ACC. The rate-by-rate reduction rate RR represents an upper limit of the reduction rate when the amount of change in the reduction rate of the driving force TP stays in a range capable of damping vehicle body vibration caused by torsion of the drive system. The amount of change in the reduction rate is calculated by use of a calculation map MAP3 that stores a relationship among a vehicle speed V, an accelerator operation amount ACC, and the amount of change in the reduction rate beforehand calculated by, for example, experiments. The sum of the calculated value of the amount of change in the reduction rate and the amount of the travel driving force TPSM* reduced from the before-last calculation cycle to the last calculation cycle (TPSM*[i−2]−TPSM*[i−1]) is calculated as a value of the rate-by-rate reduction rate RR.

The travel driving force calculating portion 37 further calculates a reduction rate RO for crossing 0 Nm based on the vehicle speed V and the last value TPSM*[i−1]. When the driving force TP changes across zero, the power transmitting direction of the drive system is reversed, and a drive-driven relationship of the gear train disposed in the drive system switches. Thus, vehicle body vibration caused by hitting of gear teeth is liable to occur. The 0 Nm-crossing reduction rate RO represents an upper limit of the reduction rate such that the reduction rate of the driving force TP changing across zero has a value included in a range capable of damping vehicle body vibration caused by hitting of gear teeth. The 0 Nm-crossing reduction rate RO is calculated by use of the calculation map MAP3 that stores a relationship among a vehicle speed V, a driving force TP, and an upper limit of the reduction rate beforehand calculated by, for example, experiments.

The travel driving force calculating portion 37 further calculates a quotient obtained by dividing the difference between the last value TPSM* and the request driving force TPF* by a predetermined grading coefficient γa. Then, the travel driving force calculating portion 37 calculates the sum of the quotient and the last value TPSM*[i−1]. The travel driving force calculating portion 37 compares the sum with a difference obtained by subtracting a minimum value of the three reduction rates (=MIN (RB, RR, RO)) from the last value TPSM*[i−1]. Thereafter, the travel driving force calculating portion 37 sets one of the sum and the difference that has a greater value as the present value TPSM*[i] of the travel driving force. Accordingly, the travel driving force TPSM* is calculated to have a value that gradually changes the driving force generated by the power unit 10 so that the occurrence of vehicle body vibration is limited. As the value of the grading coefficient γa is increased, a following delay of the travel driving force TPSM* with respect to the request driving force TPF* is increased. The grading coefficient γa is a parameter corresponding to the time constant of delay of the travel driving force TPSM* with respect to the request driving force TPF*.

The command torque calculating portion 40 calculates the first motor command torque TM1*, which is a command value of the torque of the first M/G 12, and the second motor command torque TM2*, which is a command value of the torque of the second M/G 13, based on the target engine rotational speed NE* and the travel driving force TPSM*.

When the first motor command torque TM1* is calculated, the command torque calculating portion 40 first performs an MG1 target rotational speed calculation process to calculate a first motor target rotational speed NM1*, which is a target value of the rotational speed of the first M/G 12. Herein, the rotational speed of the first M/G 12 at which the engine rotational speed NE equals the target engine rotational speed NE* is calculated as a value of the first motor target rotational speed NM1*. From a relationship between the rotational speeds of rotary elements of the planetary gear mechanism 17 shown by the collinear diagram of FIG. 2, the value of the first motor target rotation speed NM1* is calculated as a value that satisfies the relation of the following equation.

$$NM1^* = \frac{NE^* \times (1 + \rho) - NR}{\rho} \qquad \text{Equation 1}$$

Thereafter, the command torque calculating portion 40 performs an MG1 command torque calculation process based on the first motor target rotational speed NM1* to calculate the value of the first motor command torque TM1*. Here, the command torque calculating portion 40 calculates the value of the first motor command torque TM1* to perform feedback control on the torque of the first M/G 12 based on a deviation of the first motor target rotational speed NM1* from the first motor rotational speed NM1. More specifically, the command torque calculating portion 40 adds a feedback correction term according to the deviation of the first motor target rotational speed NM1* from the first motor rotational speed NM1 to the first motor command torque TM1* that is calculated in the last calculation cycle. Thereafter, the command torque calculating portion 40 calculates the sum as a calculated value of the first motor command torque TM1* in the present calculation cycle.

The command torque calculating portion 40 further performs a direct torque calculation process to calculate the direct torque TEQ from the first motor command torque TM1*. Herein, the command torque calculating portion 40 calculates a value of the direct torque TEQ when the torque of the first M/G 12 is controlled in accordance with the first motor command torque TM1*. The value of the direct torque TEQ is calculated as a value (−TM1*/ρ) obtained by dividing the first motor command torque TM1* by the ratio ρ of the number ZR of gear teeth in the ring gear 16 to the number ZS of gear teeth in the sun gear 14 and performing the positive/negative inversion on the quotient. Thereafter, the command torque calculating portion 40 multiplies the direct torque TEQ by the ratio GR2 of the number Z3 of gear teeth in the counter driven gear 20 to the number Z2 of gear teeth in the counter drive gear 19. The command torque calculating portion 40 calculates the product as a value of the final direct torque TEQ1. The value of the final direct torque TEQ1 represents a torque transmitted from the engine 11 to the counter driven gear 20 through the ring gear 16.

Thereafter, the command torque calculating portion 40 calculates the difference (=TPSM*−TEQ1) by subtracting the final direct torque TEQ1 from the travel driving force TPSM*. The command torque calculating portion 40 further calculates a quotient obtained by dividing the difference by the ratio GR3 (=Z3/Z1) of the number Z3 of gear teeth in the counter driven gear 20 to the number Z1 of gear teeth in the reduction gear 21 as a value of a second motor request torque TREQ.

Thereafter, the command torque calculating portion 40 calculates the second motor command torque TM2* by performing a torque limiting process on the second motor request torque TREQ based on the charge limit value WIN and the discharge limit value WOUT, which have been described above. In the torque limiting process, the upper limit TMAX and the lower limit TMIN of the second motor command torque TM2* are calculated so that the relation of the following equation is satisfied. Thereafter, the value of the second motor command torque TM2* is calculated by performing lower-limit and upper-limit guard processes on the value of the second motor request torque TREQ so that the value is greater than or equal to the lower limit TMIN and less than or equal to the upper limit TMAX.

$$TMAX = \frac{WIN - NM1 \times TM1*}{NM2}$$ Equation 2

$$TMIN = \frac{WOUT - NM1 \times TM1*}{NM2}$$

As described above, the request engine output calculating portion 39 calculates request engine power PE*, which corresponds to a request value of engine output, from the final request driving force TP*. The value of the final request driving force TP* is calculated by the dashpot control processing portion 38 performing a dashpot control process on the request driving force TPF*, which is calculated from the accelerator operation amount ACC by the request driving force calculating portion 36. The dashpot control process will be hereinafter described.

Figure 9:
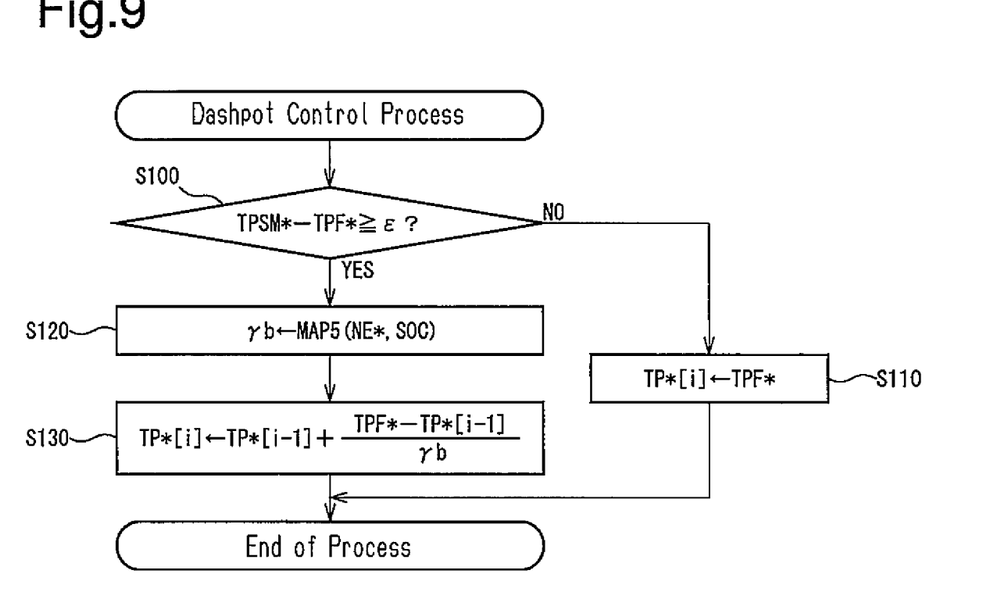
FIG. 9 is a flowchart of a dashpot control process.

FIG. 9 is a flowchart of the dashpot control process performed by the dashpot control processing portion 38 in the calculation cycles described above. Hereinafter, the value of the final request driving force TP* that is calculated in the last calculation cycle is referred to as the last value TP*[i−1]. The value of the final request driving force TP* that is calculated in the present calculation cycle is referred to as the present value TP*[i].

When the process starts, the dashpot control processing portion 38 first determines whether a difference (=TPSM*−TPF*) obtained by subtracting the request driving force TPF* from the travel driving force TPSM* is greater than or equal to a determination value s in step S100. The determination value s is set to a predetermined positive value. The difference described above (=TPSM*−TPF*) being greater than or equal to the determination value s indicates that the request driving force TPF* is largely deviated from the travel driving force TPSM* due to a quick decrease in the accelerator operation amount ACC. If the difference is greater than or equal to the determination value s (YES), the dashpot control processing portion 38 advances the process to step S120. If the difference is less than the determination value (NO), the dashpot control processing portion 38 sets the present value TP*[i] to the request driving force TPF* in step S110 and then ends the process.

Figure 10:
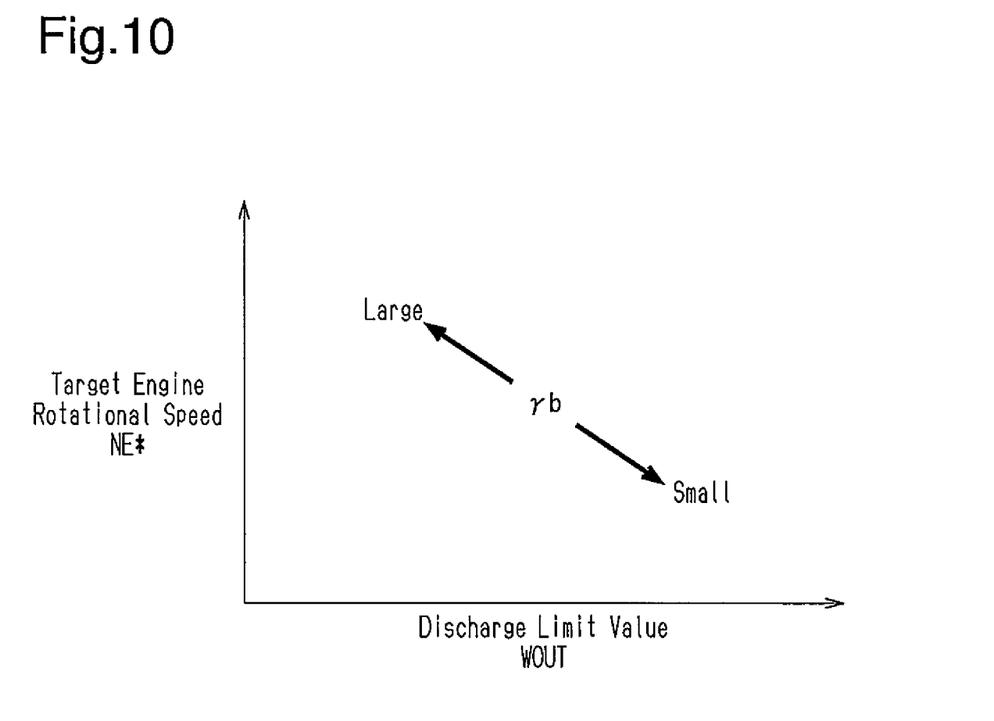
FIG. 10 is a graph showing a relationship between a target engine rotational speed, a discharge limit value, and a time constant in a calculation map that is referenced when a request driving force for dashpot control is calculated.

The dashpot control processing portion 38 sets a grading coefficient γb based on the target engine rotational speed NE* and the discharge limit value WOUT of the battery 28 in step S120. As shown in FIG. 10, the grading coefficient γb is set to larger values as the target engine rotational speed NE* is increased or the discharge limit value WOUT is decreased. As the grading coefficient γb increases, a following delay of the final request driving force TP* with respect to the request driving force TPF* is increased. The grading coefficient γb is a parameter corresponding to the time constant of delay of the final request driving force TP* with respect to the request driving force TPF*. The lower limit of the grading coefficient γb is greater than the value of the grading coefficient γa that is used to calculate the travel driving force TPSM*.

In step S130, the dashpot control processing portion 38 calculates the present value TP*[i] so that the relation of the following equation is satisfied, and then ends the process.

$$TP^*[i] = TP^*[i-1] + \frac{TPF^* - TP^*[i-1]}{\gamma b}$$ [Equation 3]

When the difference obtained by subtracting the request driving force TPF* from the travel driving force TPSM* is greater than or equal to the determination value ε, the final request driving force TP* calculated in step S130 is a value that belatedly follows the request driving force TPF*. Herein, the final request driving force TP* that is calculated in step S130 corresponds to a dashpot control driving force. When the difference obtained by subtracting the request driving force TPF* from the travel driving force TPSM* is less than the determination value ε, the dashpot control processing portion 38 sets the value of the request driving force TPF* as the value of the final request driving force TP*. Therefore, in a period during which the difference obtained by subtracting the request driving force TPF* from the travel driving force TPSM* is less than the determination value ε, the engine output calculating portion 39 calculates the request engine power PE* in accordance with the request driving force TPF*. In a period during which the above difference is greater than or equal to the determination value ε, the request engine output calculating portion 39 calculates the request engine power PE* in accordance with the dashpot control driving force, which belatedly follows the request driving force TPF*.

Next, the operation and effect of the present embodiment configured as above will be described.

In the present embodiment, the request driving force TPF* is calculated in accordance with the accelerator operation amount ACC. Additionally, the travel driving force TPSM* is calculated so as to further gradually change with respect to a change in the request driving force TPF*. Thereafter, the request engine power PE* is calculated from the final request driving force TP*, which is obtained by performing the dashpot control process on the request driving force TPF*. The engine output is controlled in accordance with the calculated request engine power PE*.

Additionally, the torque control of the first M/G 12 is performed so that the engine rotational speed NE is equal to the target engine rotational speed NE*, which is set in accordance with the request engine power PE*. In a state in which the engine rotational speed NE is equal to the target engine rotational speed NE*, the engine 11 generates the final request driving force TP* in the power unit 10.

The torque control of the second M/G 13 is performed so that the second M/G 13 generates a torque corresponding to a difference obtained by subtracting the final direct torque TEQ1 from the travel driving force TPSM*. The final direct torque TEQ1 represents a driving force generated by the engine 11 in the power unit 10. Therefore, the output control of the engine 11, the torque control of the first M/G 12, and the torque control of the second M/G 13 are performed so that, in the power unit 10, the engine 11 generates the final request driving force TP* and the second M/G 13 generates the driving force corresponding to the difference between the travel driving force TPSM* and the request driving force TPF*.

In the dashpot control process, when the difference obtained by subtracting the request driving force TPF* from the travel driving force TPSM* is less than the determination value ε, the value of the request driving force TPF* is set as the value of the final request driving force TP*. When the difference is greater than or equal to the determination value ε, a value (dashpot control driving force) that belatedly follows the request driving force TPF* in the period during which the difference is greater than or equal to the determination value ε is set as the value of the final request driving force TP*. If the dashpot control process described above is not performed and the value of the request driving force TPF* is always set as the value of the final request driving force TP* that is used to calculate the request engine power PE*, the following problem may occur.

Figure 11:
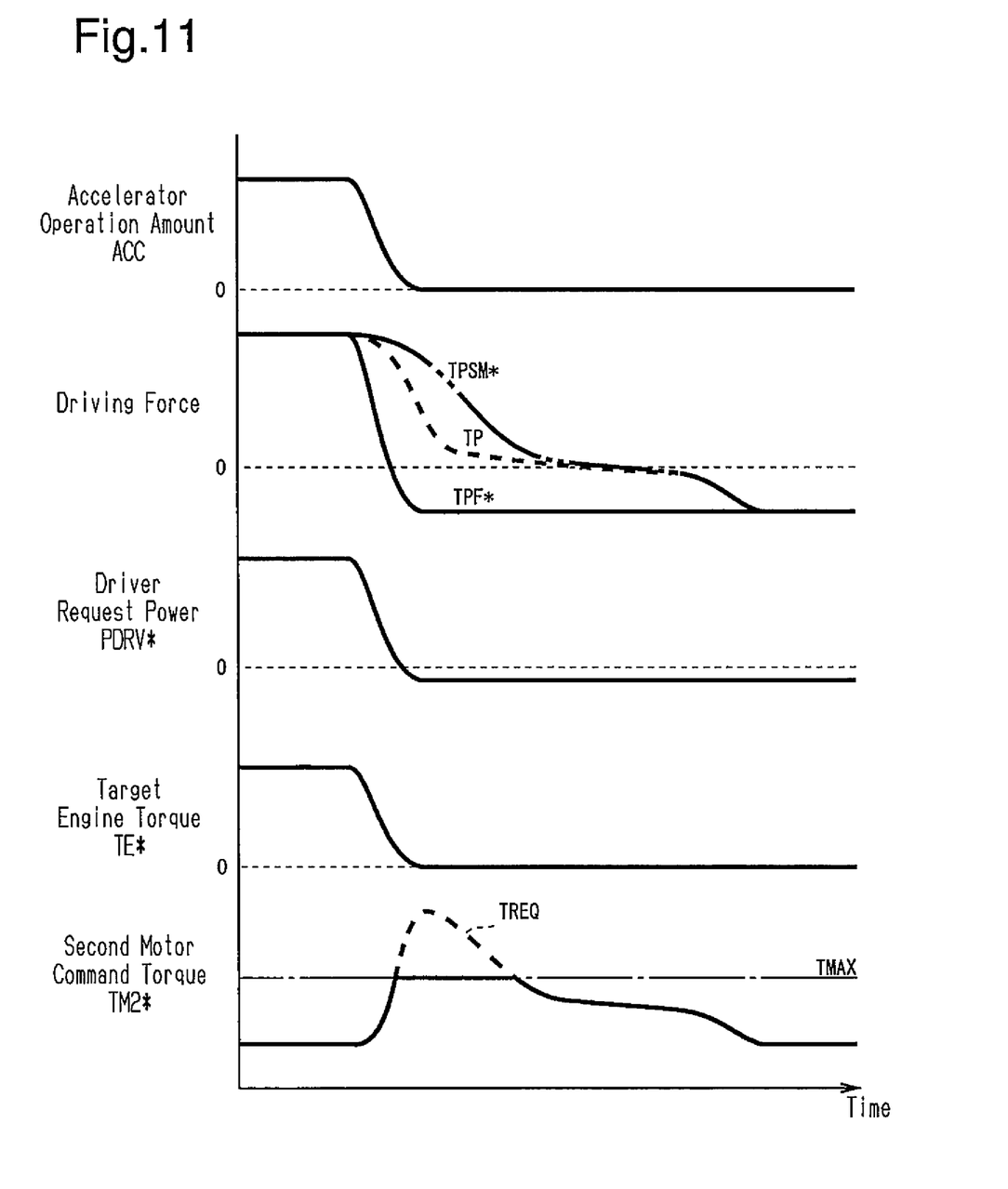
FIG. 11 is a time chart showing a control mode when the accelerator is deactivated in a case in which the dashpot control process is not performed.

FIG. 11 shows a situation in which the dashpot control process is not performed and the accelerator is deactivated. When the accelerator operation amount ACC is quickly reduced to zero, the request driving force TPF* is also quickly reduced in accordance with the reduction. However, the travel driving force TPSM* is set to a value that gradually changes a driving force generated in the power unit 10 so that vehicle body vibration will not be generated.

If the dashpot control process is not performed, the value of the driver request power PDRV* and the value of the target engine torque TE* are also quickly reduced in accordance with a quick reduction in the request driving force TPF* resulting from a deactivation of the accelerator. Therefore, the request driving force TPF* is largely deviated from the travel driving force TPSM* immediately after the deactivation of the accelerator. This increases the torque (second motor request torque TREQ) of the second M/G 13 needed to shift the driving force generated by the power unit 10 along the value of the travel driving force TPSM*. As a result, the second motor request torque TREQ of the second M/G 13 needed to realize the travel driving force TPSM* may exceed the upper limit TMAX depending on the discharge limit value WOUT. In this case, the driving force TP that is actually generated temporarily falls below the travel driving force TPSM*, and the reduction rate of the driving force TP increases. Thus, occurrence of vehicle body vibration cannot be limited.

Figure 12:
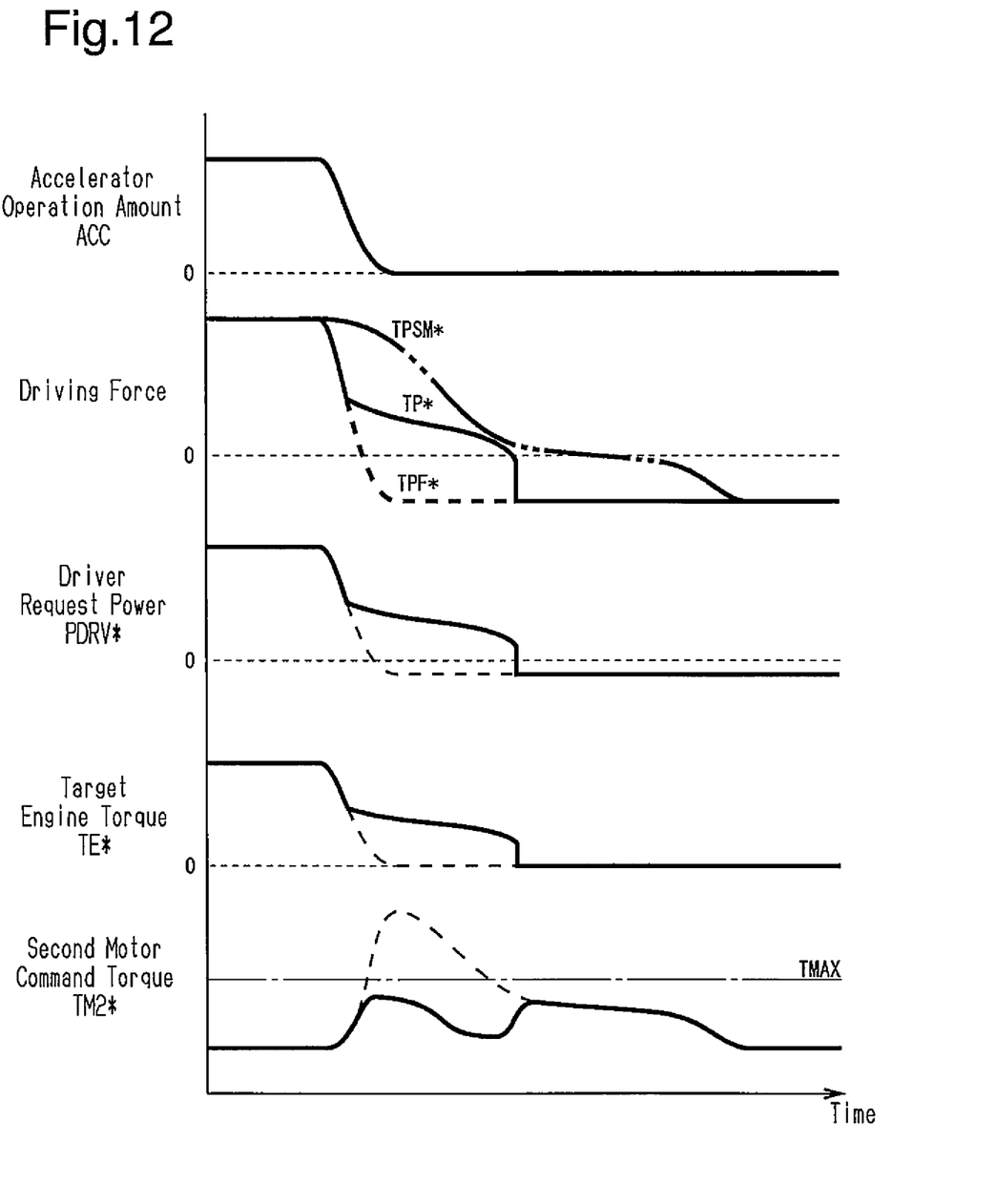
FIG. 12 is a time chart showing a control mode when the accelerator is deactivated by means of the control apparatus of the present embodiment.

As shown in FIG. 12, when the difference obtained by subtracting the request driving force TPF* from the travel driving force TPSM* is increased and is greater than or equal to the determination value ε, a value (dashpot control request driving force) that belatedly follows the request driving force TPF* is set as the value of the final request driving force TP*. Subsequently, the deviation of the request driving force TPF* from the travel driving force TPSM* is limited. This decreases the second motor command torque TM2* needed to realize the travel driving force TPSM* and allows the actual driving force TP to easily shift following the travel driving force TPSM*. Thus, when the accelerator operation amount ACC is quickly reduced such as when the accelerator is deactivated, vehicle body vibration is appropriately damped.

Changes in the engine torque TE have a response delay caused by a delay in the conveyance of intake air in the engine 11. Thus, if a value that belatedly follows the request driving force TPF* is set as a value of the final request driving force TP* immediately after a deactivation of the accelerator, even after the accelerator is deactivated, the engine torque TE continues to be close to the value that was used before the deactivation of the accelerator. This may cause the second motor command torque TM2* needed to realize the travel driving force TPSM* to have a negative value. In this case, the second M/G 13 generates electric power, and the battery 28 tends to be overcharged. In this regard, in the present embodiment, the value that belatedly follows the request driving force TPF* is set as a value of the final request driving force TP* only in a period during which the difference obtained by subtracting the request driving force TPF* from the travel driving force TPSM* is greater than or equal to the determination value ε. Thus, the battery 28 is not easily overcharged.

Additionally, when the driving force TP changes across zero, vehicle body vibration easily occurs due to hitting of gear teeth. In particular, when the driving force is near zero and the travel driving force TPSM* cannot be realized because of an insufficient torque of the second M/G 13, vehicle body vibration easily occurs. In this regard, in the present embodiment, when the difference obtained by subtracting the request driving force TPF* from the travel driving force TPSM* is greater than or equal to the determination value ε, the lower limit of the grading coefficient γb used to calculate the final request driving force TP* (dashpot control driving force) is set to be a greater value than the grading coefficient γa used to calculate the travel driving force TPSM*. Therefore, in a period during which the difference obtained by subtracting the request driving force TPF* from the travel driving force TPSM* is greater than or equal to the determination value ε, the value of the final request driving force TP* (dashpot control driving force) belatedly follows the request driving force TPF* at a greater time constant than the travel driving force TPSM*. In other words, the reduction rate of the final request driving force TP* in a period during which the above difference is greater than or equal to the determination value c is smaller than the reduction rate of the travel driving force TPSM*. In this case, as the travel driving force TPSM* decreases toward zero, the difference between the final request driving force TP* and the travel driving force TPSM* is decreased, and the torque of the second M/G 13 needed to realize the travel driving force TPSM* is decreased. Thus, when the driving force TP is near zero, the torque of the second M/G 13 will not easily become insufficient.

When the discharge limit value WOUT, which is an upper limit of the discharge amount per unit time of the battery 28 that supplies electric power to the second M/G 13, is small, the power supply amount of the second M/G 13 is easily limited, and it is difficult to ensure the torque of the second M/G 13 needed to realize the travel driving force TPSM*. In this regard, in the present embodiment, when the discharge limit value WOUT is set to a small value, the grading coefficient γb is set to be greater than when the discharge limit value WOUT is set to a large value. Consequently, as the value of the discharge limit value WOUT is decreased, the reduction rate of the final request driving force TP* (dashpot control request driving force) is decreased in a period during which the difference between the final request driving force TP* and the travel driving force TPSM* is greater than or equal to the determination value ε.

Additionally, in the present embodiment, the torque control of the first M/G 12 is performed so that the engine rotational speed NE is equal to the target engine rotational speed NE*. Therefore, when a high rotational speed is set as the target engine rotational speed NE*, as compared to when a low rotational speed is set as the target engine rotational speed NE*, the first motor command torque TM1* needed to realize the target engine rotational speed NE* is increased, and the power consumption of the first M/G 12 is liable to increase. This reduces electric power that can be supplied to the second M/G 13. Thus, it is difficult to ensure the torque of the second M/G 13 needed to realize the travel driving force TPSM*. In this regard, in the present embodiment, when a high rotational speed is set as the target engine rotational speed NE*, the grading coefficient γb is set to a larger value than when a low rotational speed is set as the target engine rotational speed NE*. Consequently, as the rotational speed that is set for the target engine rotational speed NE* is increased, the reduction rate of the final request driving force TP* (dashpot control request driving force) is decreased in a period during which the difference between the final request driving force TP* and the travel driving force TPSM* is greater than or equal to the determination value ε.

As described above, in the present embodiment, when it is difficult to ensure the power supply amount of the second M/G 13, the value of the final request driving force TP* is set so that the second motor command torque TM2* needed to realize the travel driving force TPSM* is decreased. This further appropriately damps vehicle body vibration.

The above embodiment may be modified as follows.

In the above embodiment, the value of the grading coefficient γb is variably set in accordance with the discharge limit value WOUT and the target engine rotational speed NE*. However, the value of the grading coefficient γb may be variably set in accordance with only one of the discharge limit value WOUT and the target engine rotational speed NE*. Additionally, the value of the grading coefficient γb may be set as a constant.

In the above embodiment, the value of the grading coefficient γb is set to be larger than that of the grading coefficient γa, and in a period during which the difference of the request driving force TPF* with respect to the travel driving force TPSM* is greater than or equal to the determination value ε, the reduction rate of the final request driving force TP* is set to be smaller than the reduction rate of the travel driving force TPSM*. However, even if a value that is smaller than or equal to the value of the grading coefficient γa is set as the value of the grading coefficient γb, in a period during which the difference given above is greater than or equal to the determination value ε, the torque of the second M/G 13 needed to realize the travel driving force TPSM* is decreased as compared to a case in which the dashpot control process is not performed. Thus, vehicle body vibration is damped more appropriately than in a case in which the dashpot control process is not performed.

As long as the travel driving force TPSM* is calculated to have a value that belatedly follows the request driving force TPF*, the travel driving force TPSM* may be calculated according to a mode differing from the mode of the above embodiment. In the same manner, as long as the final request driving force TP* has a value that belatedly follows the request driving force TPF* in a period during which the difference of the request driving force TPF* from the travel driving force TPSM* is greater than or equal to the determination value ε, the value of the final request driving force TP* in the period may be calculated according to a mode differing from the mode of the above embodiment.

The control apparatus of the above embodiment is applied to the hybrid vehicle including the planetary gear mechanism 17 in which three rotary elements consisting of the sun gear 14, the planetary carrier 15, and the ring gear 16 are drivably connected to the engine 11, the first motor generator 12, and the driving shaft 26, respectively. However, the control apparatus of the above embodiment may be applied to a hybrid vehicle that does not include the planetary gear mechanism 17 described above.

In a control apparatus for a hybrid vehicle that includes only one motor generator in a power unit, the output control of an engine and the torque control of a motor generator may be performed according to the following mode. In detail, a request driving force is calculated in accordance with an accelerator operation amount, and engine output is controlled in accordance with request engine output calculated from the resulting request driving force. Additionally, a travel driving force is calculated as a value that belatedly follows the request driving force, and the torque of the motor generator is controlled so that the power unit generates a driving force equivalent to a travel driving force in a state in which the engine generates output equivalent to request engine output. Also, in this case, a dashpot control request driving force is calculated as a value that belatedly follows a request driving force when a difference obtained by subtracting the request driving force from the travel driving force is greater than or equal to a predetermined positive value. In a period during which the above difference is greater than or equal to the predetermined positive value, the request engine output is calculated from a dashpot control driving force. In this case, the torque of the motor generator needed to realize the travel driving force is smaller than in a case in which the request engine output is calculated from the request driving force. Thus, vehicle body vibration is further appropriately damped.

The invention claimed is:

1. A control apparatus for a hybrid vehicle that travels by a driving force generated by a power unit having an engine and a motor generator as two types of driving sources, the control apparatus comprising:
   a request driving force calculating portion configured to calculate a request driving force in accordance with an accelerator operation amount;
   a travel driving force calculating portion configured to calculate a travel driving force that belatedly follows the request driving force;
   a request engine output calculating portion configured to calculate a request engine output, which is a request value of engine output, in accordance with the request driving force;
   an engine output controller configured to control output of the engine in accordance with the request engine output;
   a command torque calculating portion configured to calculate torque of the motor generator that is needed so that the power unit generates the driving force according to the travel driving force as a command torque in a state in which the engine generates output according to the request engine output;
   a motor torque controller configured to control the torque of the motor generator in accordance with the command torque; and
   a dashpot control processing portion configured to calculate a dashpot control request driving force as a final request driving force when a difference obtained by subtracting the request driving force from the travel driving force is greater than or equal to a predetermined positive value, the dashpot control request driving force belatedly following the request driving force at a greater time constant than the travel driving force, and calculate the request driving force as the final request driving force when the difference obtained by subtracting the request driving force from the travel driving force is less than the predetermined positive value,
   wherein the request engine output calculating portion is configured to calculate the request engine output in accordance with the dashpot control request driving force in a period during which the difference obtained by subtracting the request driving force from the travel driving force is greater than or equal to the predetermined positive value.

2. The control apparatus for the hybrid vehicle according to claim 1, wherein the dashpot control processing portion is configured to calculate the dashpot control request driving force so that when a discharge limit value, which is an upper limit of a discharge amount per unit time of a battery that supplies electric power to the motor generator, is small, a time constant of a delay with respect to the request driving force is larger than when the discharge limit value is large.

3. The control apparatus for the hybrid vehicle according to claim 1, wherein the power unit includes:
- a second motor generator that is the motor generator;
- a first motor generator that is a motor generator differing from the second motor generator; and
- a planetary gear mechanism including three rotary elements, which are a first rotary element connected to the engine, a second rotary element connected to the first motor generator, and a third rotary element connected to the second motor generator and to a driving shaft of the hybrid vehicle, wherein
- the engine output controller is configured to set a target engine rotational speed based on the request engine output,
- the motor torque controller is configured to control torque of the first motor generator so that a rotational speed of the engine is equal to the target engine rotational speed, and
- the dashpot control processing portion is configured to calculate the dashpot control request driving force so that when a high rotational speed is set as the target engine rotational speed, a time constant of a delay in the dashpot control request driving force with respect to the request driving force has a larger value than when a low rotational speed is set as the target engine rotational speed.

4. The control apparatus for the hybrid vehicle according to claim 1, wherein the travel driving force belatedly follows the request driving force so that vehicle body vibration will not occur due to changing the accelerator operation amount.

5. The control apparatus for the hybrid vehicle according to claim 4, wherein the dashpot control request driving force belatedly follows the request driving force so that vehicle body vibration will not occur due to the accelerator operation amount being reduced in a manner that would otherwise cause vibration inducing deviation between the request driving force and the travel driving force.

6. The control apparatus for the hybrid vehicle according to claim 1, wherein the dashpot control request driving force belatedly follows the request driving force so that vehicle body vibration will not occur due to the accelerator operation amount being reduced in a manner that would otherwise cause vibration inducing deviation between the request driving force and the travel driving force.

7. A control apparatus for a hybrid vehicle that travels by a driving force generated by a power unit having an engine and a motor generator as two types of driving sources, the control apparatus comprising a circuit, wherein the circuit includes:
- a power controller configured to
  - calculate a request driving force in accordance with an accelerator operation amount,
  - calculate a travel driving force that belatedly follows the request driving force,
  - calculate a request engine output, which is a request value of engine output, in accordance with the request driving force,
  - calculate torque of the motor generator that is needed so that the power unit generates the driving force according to the travel driving force as a command torque in a state in which the engine generates output according to the request engine output, and
  - calculate a dashpot control request driving force as a final request driving force when a difference obtained by subtracting the request driving force from the travel driving force is greater than or equal to a predetermined positive value, the dashpot control request driving force belatedly following the request driving force at a greater time constant than the travel driving force, and calculate the request driving force as the final request driving force when the difference obtained by subtracting the request driving force from the travel driving force is less than the predetermined positive value,
- an engine output controller configured to control output of the engine in accordance with the request engine output; and
- a motor torque controller configured to control the torque of the motor generator in accordance with the command torque;
- wherein the power controller is configured to calculate the request engine output in accordance with the dashpot control request driving force in a period during which the difference obtained by subtracting the request driving force from the travel driving force is greater than or equal to the predetermined positive value.

8. A method for controlling a hybrid vehicle that travels by a driving force generated by a power unit having an engine and a motor generator as two types of driving sources, the method comprising:
- calculating a request driving force in accordance with an accelerator operation amount;
- calculating a travel driving force that belatedly follows the request driving force;
- calculating a request engine output, which is a request value of engine output, in accordance with the request driving force;
- controlling output of the engine in accordance with the request engine output;
- calculating torque of the motor generator that is needed so that the power unit generates the driving force according to the travel driving force as a command torque in a state in which the engine generates output according to the request engine output;
- controlling torque of the motor generator in accordance with the command torque;
- calculating a dashpot control request driving force as a final request driving force when a difference obtained by subtracting the request driving force from the travel driving force is greater than or equal to a predetermined positive value, the dashpot control request driving force belatedly following the request driving force at a greater time constant than the travel driving force, and calculate the request driving force as the final request driving force when the difference obtained by subtracting the request driving force from the travel driving force is less than the predetermined positive value; and
- calculating the request engine output in accordance with the dashpot control request driving force in a period during which the difference obtained by subtracting the request driving force from the travel driving force is greater than or equal to the predetermined positive value.

* * * * *

UNITED STATES PATENT AND TRADEMARK OFFICE
CERTIFICATE OF CORRECTION

PATENT NO.        : 11,130,495 B2
APPLICATION NO.   : 16/110200
DATED             : September 28, 2021
INVENTOR(S)       : Shunya Kato et al.

It is certified that error appears in the above-identified patent and that said Letters Patent is hereby corrected as shown below:

On the Title Page (73) Should read:
TOYOTA JIDOSHA KABUSHIKI KAISHA, Toyota (JP)
AISIN AW CO., LTD., Anjo (JP)

Signed and Sealed this
Sixth Day of September, 2022

Katherine Kelly Vidal
*Director of the United States Patent and Trademark Office*